United States Patent Office 2,934,541
Patented Apr. 26, 1960

2,934,541
PREPARATION OF LYSINE

Donald E. Tuites, Tonawanda, N.Y., assignor to E. I. du Pont de Nemours and Company, Wilmington, Del., a corporation of Delaware No Drawing. Application February 5, 1958
Serial No. 713,285

4 Claims. (Cl. 260—309.5)

This invention relates to the preparation of lysine by a new method.

Lysine is an essential amino acid which is useful commercially as an additive for various animal and human foods. Lysine can be obtained from proteins and various methods have been proposed for obtaining it synthetically. The present invention relates to a new method for obtaining it synthetically from readily available starting materials.

It is an object of this invention to provide a new and improved method for producing lysine. A further object is to provide a new method for producing lysine starting with readily available piperidine. Still further objects will be apparent from the following description.

Lysine is obtained in accordance with the invention by (1) converting piperidine to N-chloropiperidine by reaction with an inorganic hypochlorite, (2) dehydrochlorinating the N-chloropiperidine by reaction with an alkali metal hydroxide, (3) reacting the resulting α-trimer of 2,3,4,5-tetrahydropyridine with hydrogen cyanide and ammonia or their equivalents, and (4) hydrolyzing the resulting product to obtain lysine. Step 3 is preferably carried out by reacting the α-trimer of the tetrahydropyridine with hydrogen cyanide, ammonia and carbon dioxide, or their equivalents, whereby it is thought that 5-(4-aminobutyl)hydantoin is formed and is hydrolyzed to lysine in step 4.

The following illustrates generally the chemical reactions involved in the method of the invention, assuming the use of carbon dioxide as a reactant in step 3:

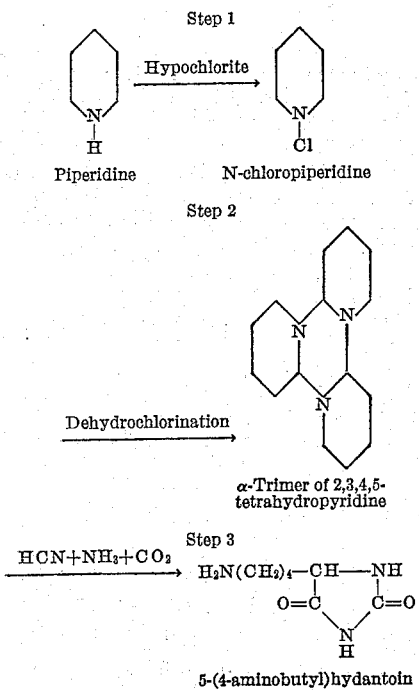

Step 4
Hydrolysis
$\longrightarrow$ $H_2N(CH_2)_4$—CH—COOH
|
$NH_2$

DL-lysine

The over-all reaction of step 3 is believed to be as indicated above when carbon dioxide, ammonium carbonate or ammonium bicarbonate is used as a reactant. If so, the reaction mechanism could involve hydrolysis of the α-trimer of the tetrahydropyridine to form 2-hydroxypiperidine in equilibrium with its acyclic form, delta-aminovaleraldehyde, as indicated by the following:

α-Trimer of 2,3,4,5-tetrahydropyridine $\xrightarrow{H_2O}$

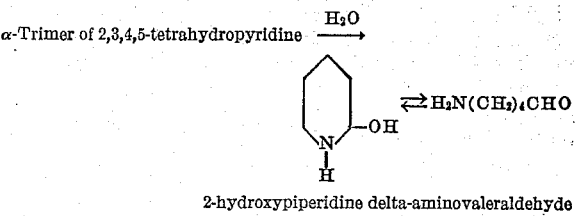

2-hydroxypiperidine    delta-aminovaleraldehyde

The aminovaleraldehyde is then visualized as reacting with hydrogen cyanide, ammonia and carbon dioxide to form 5-(4-aminobutyl)hydantoin.

However, the correctness of the above mechanism is not certain because step 3 can be practiced to obtain a product which hydrolyzes to lysine in step 4 even though carbon dioxide (or ammonium carbonate or bicarbonate) is completely omitted as a reactant in step 3. Since omission of carbon dioxide as a reactant in step 3 precludes the formation of 5-(4-aminobutyl)hydantoin as an intermediate, it is evident that the formation of the above aminobutylhydantoin in step 3 is not necessary for obtaining lysine in step 4.

The method of the invention is illustrated by the following examples in which all percentages of reagents are by weight.

EXAMPLE 1

A. Preparation of the α-trimer of 2,3,4,5-tetrahydropyridine

One and one-half liters of an aqueous solution of calcium hypochlorite containing 2.2 moles of hypochlorite ion is placed in a reaction flask and maintained at —5 to 0° C. by means of an ice-salt bath. To this solution is added over a period of 30 minutes with rapid stirring, a solution of piperidine acetate (prepared by adding 60 g. (1 mole) glacial acetic acid to 85 g. (1 mole) freshly distilled piperidine cooled to 0° C., and adding sufficient ice to keep the mixture fluid). The resulting oily mixture is extracted with ether and the extract is dried 0.5 hr. over anhydrous sodium sulfate. Ether is then removed from the extract until 124 g. of a light yellow residue of N-chloropiperidine remains.

Five hundred fifty grams of 10% alcoholic potassium hydroxide solution is heated to boiling and the above crude N-chloropiperidine is added rapidly thereto, causing vigorous reflux. The resulting dark orange mixture is heated under reflux for 10 minutes, the by-product potassium chloride is filtered off and the alcohol is removed under vacuum (80 mm. Hg, 50° C.). A wash solution is made up by dissolving the filtered potassium chloride in 500 ml. water.

The dark orange product is mixed with the wash solution and extracted with ether. Removal of the ether from the extract gives a viscous orange oil which crystallizes on standing. Recrystallization of the crystals from acetone gives 42 g. (0.17 mole) of the α-trimer of 2,3,4,5-tetrahydropyridine melting at 56–68.5° C., representing a 51% over-all yield from piperidine. When further purified by recrystallization from acetone, the product melted at 60–61° C.

B. *Conversion of a α-trimer of 2,3,4,5-tetrahydropyridine to DL-lysine*

A mixture of 6.2 g. (0.025 mole) of the α-trimer of 2,3,4,5-tetrahydropyridine, 6.32 g. (0.08 mole) of ammonium bicarbonate, 2.16 g. (0.08 mole) hydrogen cyanide and 25 ml. water is heated 4 hours at 100° C. in a Carius tube. The resulting mixture is then boiled till free of ammonia, and hydrolyzed by heating in a Carius tube with 25 ml. of concentrated (37%) hydrochloric acid for 4 hours at 180° C. The resulting reddish-colored solution is diluted with water to 500 ml., then passed through a column of 250 ml. "Dowex" 50 X-8 cation-exchange resin in its ammonium form. This resin is a sulfonated copolymer of styrene and 8% divinyl benzene. The column is then neutralized with 1% aqueous ammonia and eluted with 15% aqueous ammonia. After removing ammonia from the effluent by boiling, the latter is found by analysis to contain 4.11 g. (0.028 mole) of DL-lysine, representing a yield based on the above α-trimer of 38%.

EXAMPLE 2

The general procedure of Example 1 is repeated except that:
 a. Sodium hypochlorite is used in place of calcium hypochlorite,
 b. Piperidine is used in place of piperidine acetate,
 c. Benzene is used to extract the N-chloropiperidine intermediate and the resulting extract is reacted with the alcoholic potassium hydroxide solution.
 d. The crude α-trimer of 2,3,4,5-tetrahydropyridine is not isolated before being reacted with hydrogen cyanide and ammonium bicarbonate.

The over-all yield of lysine from piperidine is 14.2%.

EXAMPLE 3

The general procedure of Example 1 is repeated except that:
 a. Piperidine is used instead of piperidine acetate,
 b. The reaction to form the N-chloropiperidine is carried out at 20° C.,
 c. The intermediate N-chloropiperidine is extracted with benzene and is dehydrochlorinated with alcoholic sodium hydroxide,
 d. The intermediate α-trimer of 2,3,4,5-tetrahydropyridine is not separated by crystallization before being reacted with hydrogen cyanide and ammonium carbonate.

The over-all yield of lysine from piperidine is 7%.

EXAMPLE 4

Six and two tenths grams (0.025 mole) of crystalline α-trimer of 2,3,4,5-tetrahydropyridine, 3.1 ml. (0.08 mole) hydrogen cyanide, and 27 ml. of 28% aqueous ammonia (0.4 mole) and 25 ml. water are heated in a Carius tube for 3 hours at 100° C. After boiling off excess ammonia, the mixture is heated with 25 ml. of concentrated (37%) hydrochloric acid for 4 hours at reflux temperature. The resulting hydrolyzate mixture is diluted with water to 500 ml. then passed through a 250 ml. column of "Dowex" 50 X-8 cation exchange resin in its ammonium form. The column is then neutralized with 1% aqueous ammonia, and eluted with 15% aqueous ammonia. The effluent, after boiling off the ammonia, contains 3.69 g. (0.025 mole DL-lysine) corresponding to a 34% yield based on the α-trimer of 2,3,4,5-tetrahydropyridine.

The above example shows that the α-trimer of 2,3,4,5-tetrahydropyridine can be reacted with hydrogen cyanide and ammonia alone to yield an intermediate product which hydrolyzes to lysine.

The reaction of step 1 to produce N-chloropiperidine can be carried out using piperidine or a salt thereof such as the acetate or the hydrochloride. Any water-soluble inorganic hypochlorite such as hypochlorous acid and the alkali metal and the alkaline earth metal hypochlorites can be used as the hypochlorite reactant. Sodium and calcium hypochlorite are generally preferred for availability and cost reasons. The hypochlorite will generally be employed in amounts equivalent to at least 2, e.g., 2 to 4, moles of hypochlorite ion (ClO−) per mole of piperidine, a molar ratio of about 2.1–3 being preferred. Temperatures from the freezing point to the boiling point of the reaction mixture can be used, those ranging from about 0 to 30° C. being preferred. The N-chloropiperidine product of step 1 is separated from the reaction mixture before use in step 2 e.g., by extraction with any suitable volatile inert organic solvent therefor, such as the alkyl ethers, benzene, petroleum ether, or chloroform.

The step 2 reaction to convert the N-chloropiperidine to the α-trimer of 2,3,4,5-tetrahydropyridine can be effected by reaction with a solution of an alkali metal hydroxide in a lower aliphatic alcohol. Solutions of potassium or sodium hydroxide in ethanol are preferred. Generally, at least 1 mole, e.g. 1 to 3 moles, and preferably 1.1 to 1.5 moles of the alkali metal hydroxide will be used per mole of N-chloropiperidine. Temperatures from about room temperature to 100° C. can be used but those from about 50 to the atmospheric boiling point of the reaction mixture are preferred. Temperatures above the atmospheric boiling point can be used when operating under pressure. Atmospheric reflux conditions are usually most practical. The reaction proceeds rapidly under the preferred conditions and is usually complete within a few minutes to 1 hour. Completion of the reaction is indicated when all organic chlorine has been converted to chloride ion.

Step 3 of the process effects the conversion of the α-trimer of 2,3,4,5-tetrahydropyridine to a substance which yields lysine on hydrolysis. This is accomplished by reacting the above α-trimer in an aqueous medium with a compound yielding cyanide ions, a compound yielding ammonium ions and a compound yielding carbonate ions under conditions well-known and used for producing hydantoins from aldehydes. It is preferred to use elevated reaction temperatures, e.g., 60 to 150° C., under pressure if necessary to maintain the reactants in the aqueous reaction mixture. Typical of suitable compounds yielding cyanide ions are hydrogen cyanide, the alkali metal cyanides, e.g. sodium cyanide, and the alkaline earth metal cyanides, e.g. calcium cyanide. Ammonium carbonate, ammonium bicarbonate and ammonia with carbon dioxide, are suitable as sources of both ammonium and carbonate ions. Other suitable compounds yielding one or the other of these ions are ammonium chloride, ammonium carbonate and sodium carbonate. An excess of any of the individual reactants can be used but for economic reasons, an excess of the α-trimer of the tetrahydropyridine will be generally avoided. Reactants equivalent to about 3 to 6 moles of cyanide ions, 3 to 45 moles of ammonium ions and 3 to 30 moles of carbonate ions will generally be used per mole of the α-trimer of tetrahydropyridine.

The above conditions, including proportions of reactants, for carrying out step 3 of the process are also applicable for carrying out the alternative step 3 procedure illustrated in Example 3. However, in this instance, no reactant supplying carbonate ion is used and the preferred reactants other than the α-trimer of tetrahydropyridine are hydrogen cyanide and ammonia, either in anhydrous or aqueous form.

The reaction product resulting from either of the above step 3 procedures can be hydrolyzed to lysine by any of the well-known methods for hydrolyzing hydantoins to amino acids. Hydrolysis by heating in the presence of an acid or a base is preferred, employing for example, a strong acid such as hydrochloric, hydrobromic, or sulfuric acid; or a strong base such as the alkali metal hydroxides, e.g. sodium hydroxide, or the alkaline earth metal hydroxides, e.g. barium hydroxide. At least 6 equivalents of the strong acid should be used per mole of the α-trimer of tetrahydropyridine employed in step 3, but it is generally preferred to employ from 9 to 15 equivalents of the acid per mole of the α-trimer compound. When using a base, there should be used at least 12 equivalents, preferably 18 to 30, equivalents of the base per mole of the α-trimer compound. There should also be present in the hydrolysis mixture at least 6 moles of water, preferably 20 to 60 moles, per mole of the α-trimer compound employed in step 3. Preferred hydrolyzing agents are hydrochloride acid, sulfuric acid and sodium hydroxide. Hydrolysis can be effectively accomplished at temperatures of 80 to 300° C., the preferred temperatures being 100 to 200° C. Hydrolysis at temperatures higher than the atmospheric boiling point of the reaction mixture will of course require operating under pressure, e.g. by the use of a closed reaction vessel under autogenous pressure.

Recovery of lysine from the hydrolyzate of step 4 can be accomplished by well-known methods. Thus, when hydrolyzing with hydrochloric acid, the excess of the latter can be distilled off, the residue extracted with ethanol or methanol and lysine dihydrochloride precipitated from the extract by addition of acetone or ether. Alternatively, the alcoholic solution of the dihydrochloride may be treated with a base, e.g. pyridine, to precipitate lysine monohydrochloride. When hydrolyzing with a base such as sodium hydroxide, the hydrolyzate mixture may be heated to remove ammonia, acidified with hydrochloric acid, then evaporated. Lysine dihydrochloric can then be extracted from the residue, and the extract worked up to recover either lysine dihydrochloride or monohydrochloride as generally indicated above. Lysine can also be effectively recovered from the hydrolyzate mixture by ion-exchange methods as illustrated in the examples.

The method of the invention provides a new method for obtaining lysine which is advantageous since it involves only four steps and starts with the readily available and relatively cheap piperidine.

I claim:

1. The method of producing a compound which yields lysine upon hydrolysis comprising reacting the α-trimer of 2,3,4,5-tetrahydropyridine in an aqueous medium with a compound yielding cyanide ions and a compound yielding ammonium ions.

2. The method of producing a compound which yields lysine upon hydrolysis comprising reacting the α-trimer of 2,3,4,5-tetrahydropyridine in an aqueous medium with a compound yielding cyanide ions, a compound yielding ammonium ions and a compound yielding carbonate ions.

3. The method of producing lysine comprising reacting the α-trimer of 2,3,4,5-tetrahydropyridine in an aqueous medium at a temperature of 60 to 150° C. with a compound yielding cyanide ions and a compound yielding ammonium ions to obtain a product which yields lysine upon hydrolysis, and hydrolyzing said product to lysine.

4. The method of producing lysine comprising reacting the α-trimer of 2,3,4,5-tetrahydropyridine in an aqueous medium at a temperature of 60 to 150° C. with a compound yielding cyanide ions, a compound yielding ammonium ions and a compound yielding carbonate ions to obtain a product which yields lysine upon hydrolysis, and hydrolyzing said product to lysine.

References Cited in the file of this patent

UNITED STATES PATENTS 2,626,263    Gaudry _____ Jan. 20, 1953

OTHER REFERENCES

Delepine: Bull. Societe Chimique de Paris, 3rd series, vol. 19 (1898), pp. 613–17.